Mar. 6, 1923.

B. HARRIS 1,447,950

PIPE COUPLING AND METHOD OF MAKING THE SAME

Filed June 4, 1921

Inventor:
Barney Harris
by A.P. Greeley
Attorney

Patented Mar. 6, 1923.

1,447,950

UNITED STATES PATENT OFFICE.

BARNEY HARRIS, OF WASHINGTON, DISTRICT OF COLUMBIA.

PIPE COUPLING AND METHOD OF MAKING THE SAME.

Application filed June 4, 1921. Serial No. 474,949.

*To all whom it may concern:*

Be it known that I, BARNEY HARRIS, a citizen of the United States, residing at Washington, in the District of Columbia, have invented certain new and useful Improvements in Pipe Couplings and Methods of Making the Same, of which the following is a description, reference being had to the accompanying drawings, forming a part hereof.

My invention relates to a joint for connecting a pipe of relatively soft metal, such as lead, to a pipe of relatively hard metal, such as iron or brass, and to a method of forming such joint and has for its object to provide a means and method by which such pipes may be quickly and inexpensively connected by a non-leaking joint without the use of heat or solder, and by a joint which will permit of separation of the pipes at any time and their reuniting.

In making the connections of water and gas pipes from street mains to dwelling houses or other buildings, as well as at other points in the piping of water and gas within buildings, it is necessary to connect a lead pipe with an iron or other hard metal pipe. As lead pipe is too soft to hold a screwthread under ordinary circumstances the ordinary screwcoupling joint used with iron pipe is impractical and, as solder does not readily unite with iron, a solder joint such as is used in joining lead pipe to lead pipe, is also impractical and the connection is usually made by a wiped joint, the making of which requires considerable time of a highly skilled workman and is therefore very expensive. A wiped joint once made is permanent and the pipes connected by it cannot be separated except by cutting them apart, destroying the joint, and if to be again connected the joint must be remade at the same expense as before.

By the use of my invention it is made possible, in the manner hereinafter described and by the use of the coupling sleeve which forms a part of my invention, without tools other than an ordinary pipe expander and tap, to make a tight joint between lead pipe and pipe and iron pipe without the use of heat or solder, which will be as tight and strong as a wiped joint and will permit the pipes to be detached from each other and reconnected at will.

With the objects above described and other objects hereinafter explained in view my invention consists in the construction and combination of elements forming the joint hereinafter described and in the method of making the joint all as hereinafter described and claimed.

Referring to the drawings.

Figure 1:
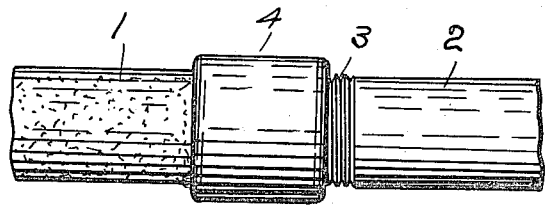
Figure 1 is a side view of a joint connecting a lead pipe and an iron pipe embodying my invention.
Figure 2:
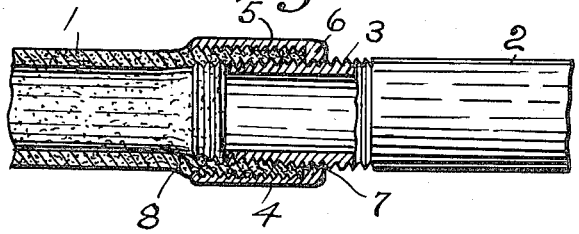
Figure 2 is a longitudinal central sectional view of the joint shown in Figure 1.

In the drawings 1 indicates a pipe of relatively soft metal, usually lead, and 2 indicates a pipe of relatively hard metal, usually iron or brass, having a screwthread 3 such as is usually formed on standard gas or water pipe formed on it. The lead and the iron pipe may be of any size desired. 4 indicates a coupling sleeve of iron or brass or other hard metal having its main portion provided with interior corrugations 5, these corrugations being most conveniently and preferably formed by screwthreading this portion of the ferrule. At one end the coupling sleeve is provided with an inwardly extending flange 6 of substantial thickness extending inward a distance corresponding substantially with the thickness of the walls of the lead pipe 1, and having a standard screwthread 7 cut in its inner face corresponding to and adapted to receive the screwthread 3 on the end of the iron pipe 2. The interior diameter of the main portion of the coupling sleeve is slightly greater than the exterior diameter of the lead pipe 1 and the interior diameter of the flange 6 is substantially the same as the interior diameter of the lead pipe.

Figure 3:
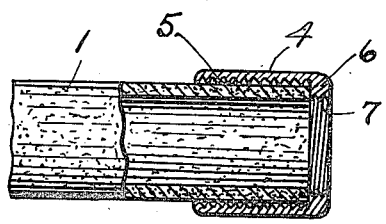
Figure 3 is a longitudinal central sectional view of the coupling sleeve in position on the lead pipe ready to have the lead pipe expanded into its corrugations.
Figure 5:
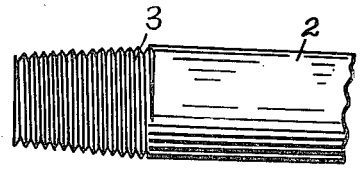
Figure 5 is a longitudinal central sectional view of the end portion of the iron pipe.
Figure 4:
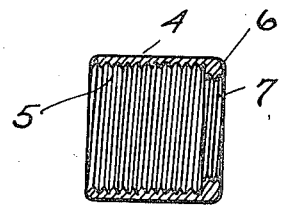
Figure 4 is a longitudinal central sectional view of the coupling sleeve.

In order to make the connection between the pipes, the lead pipe being cut off squarely and the iron pipe being previously screwthreaded, the coupling sleeve is slipped onto the end of the lead pipe until the end of the pipe abuts against the flange 6, as shown in Figure 3. An ordinary conical pipe expander is then driven into the end of the lead pipe forcing the walls of the pipe outward into the corrugations 5 of the coupling sleeve, or the pipe is otherwise expanded to effect this result. By means of an ordinary tap a screwthread 8 is then cut in the expanded portion of the lead pipe this screwthread being an extension of the screwthread 7 of the flange 6, and preferably has the usual slight taper.

On the withdrawal of the tap all that is necessary to do is to screw the end of the iron pipe through the flange 6 and into the screwthread 8 cut in the expanded portion of the lead pipe as far as it will go. The taper of the screwthread 3 will tend to force the walls of the lead pipe still further into the corrugations of the coupling member ensuring an absolutely tight joint between the exterior of the lead pipe and the coupling sleeve, and, the lead being relatively soft, the screwthreads of the iron pipe will form with the lead pipe an absolutely tight joint, the walls of the lead pipe being held against expansion by the coupling sleeve and serving, in effect as a soft metal packing. No white lead is needed to ensure a tight joint though, if desired, the joint may be leaded with white lead or the like usually needed in coupling iron pipes together.

The pipes 1 and 2 may be uncoupled at any time and recoupled the coupling sleeve affording the necessary hold for pipe tongs or wrench without danger of crushing the lead pipe. It will, however, be usually impossible to remove the lead pipe from the coupling sleeve even if the corrugations 5 are screwthreads.

The coupling sleeve should be of iron or brass or of other metal relatively hard and of sufficient tenacity to retain the corrugations and screwthreads formed in it.

While the invention is particularly adapted for use in connecting lead pipes to iron or brass pipes it may, of course, be used in joining pipes of other metals or materials where one pipe is of a metal or material of such malleability as to be readily expanded without cracking while still capable of retaining a screwthread formed in it if supported against distortion, and the other pipe is of a metal or material sufficiently tenacious to permanently retain a screwthread cut in it.

Having thus described my invention what I claim is:

1. The herein described joint uniting a soft metal pipe and a hard metal pipe comprising a coupling sleeve enclosing the end portion of the soft metal pipe having corrugations on its interior surface and having the outer surface of the soft metal pipe engaging said corrugations, said coupling sleeve having at its end an inwardly extending flange of substantial thickness and extending inward a distance corresponding with the thickness of the wall of said soft metal pipe to serve as an abutment for the end of said pipe and having a screwthread in its interior surface, said end portion of the soft metal pipe within the coupling sleeve having a screwthread formed therein continuous with the screwthread of the said flange, the end portion of the hard metal pipe being screwthreaded and fitting the screwthreads of the said flange and said end portion of the soft metal pipe.

2. The herein described method of joining a soft metal pipe to a hard metal pipe which consists in inserting the end portion of the soft metal pipe into a coupling sleeve having its body portion interiorly corrugated and having at its end an inwardly extending flange of substantial thickness having its inner surface of substantially the same diameter as the interior of the pipe and having a screwthread formed in said inner surface, expanding the portion of said soft metal pipe within the coupling sleeve to cause its outer surface to engage said corrugations, cutting a screwthread continuous with the screw thread of said flange in the expanded portion of the soft metal pipe, and screwing into said screwthread the screwthreaded end of the hard metal pipe.

3. The herein described coupling sleeve for use in forming a joint between a pipe of soft metal and a pipe of hard metal, having the interior diameter of its body portion slightly greater than the exterior diameter of the soft metal pipe and provided with corrugations on its interior surface and having at its end an inwardly extending flange with its interior diameter corresponding to the interior diameter of the pipe and provided with a screwthread.

In testimony whereof I affix my signature this 4th day of June, 1921.

BARNEY HARRIS.